US012066158B2

(12) United States Patent
Jin

(10) Patent No.: US 12,066,158 B2
(45) Date of Patent: Aug. 20, 2024

(54) LAMP FOR VEHICLE

(71) Applicant: HYUNDAI MOBIS CO., LTD., Seoul (KR)

(72) Inventor: Min Ji Jin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/071,732

(22) Filed: Nov. 30, 2022

(65) Prior Publication Data

US 2024/0093850 A1 Mar. 21, 2024

(30) Foreign Application Priority Data

Sep. 20, 2022 (KR) ........................ 10-2022-0118744

(51) Int. Cl.
*F21S 41/265* (2018.01)
*F21S 45/47* (2018.01)
*F21W 102/135* (2018.01)

(52) U.S. Cl.
CPC ............. *F21S 41/265* (2018.01); *F21S 45/47* (2018.01); *F21W 2102/135* (2018.01)

(58) Field of Classification Search
CPC .......... F21S 41/265; F21S 45/47; F21S 43/20; F21S 41/25; F21S 41/143; F21S 41/20; F21S 41/24; F21S 41/255; F21S 41/27; F21S 41/141; F21S 43/14; F21S 41/151; F21W 2102/135; F21W 2107/10; F21W 2102/30; F21W 2102/13; F21W 2102/20; F21V 5/04; F21V 5/008; F21V 5/007; F21Y 2115/10; G02B 19/0066
See application file for complete search history.

(56) References Cited

U.S. PATENT DOCUMENTS 9,651,212 B1 * 5/2017 Wasilewski ............. F21S 41/29
10,928,029 B1 * 2/2021 Woo ........................ F21S 43/26
(Continued)

FOREIGN PATENT DOCUMENTS

DE 102011112285 A1 3/2013
DE 102014203335 A1 8/2015
(Continued)

OTHER PUBLICATIONS

Office Action issued Apr. 27, 2023 in corresponding German patent application No. 102022213410.9.

*Primary Examiner* — Omar Rojas Cadima
(74) *Attorney, Agent, or Firm* — NovoTechIP International PLLC

(57) ABSTRACT

Disclosed is a lamp for a vehicle. The lamp for a vehicle includes a first optical module that forms a first light distribution pattern, and including a first light source part and a first condensing lens part that condenses light emitted from the first light source part, a second optical module that forms a second light distribution pattern, and including a second light source part and a second condensing lens part that condenses light emitted from the second light source part, and a third optical module that forms a third light distribution pattern, and including a third light source part and a third condensing lens part that condenses light emitted from the third light source part, the first optical module, the second optical module, and the third optical module are arranged in a vertical direction.

15 Claims, 21 Drawing Sheets

(56) References Cited

U.S. PATENT DOCUMENTS

| | | | | |
|---|---|---|---|---|
| 2003/0147252 | A1* | 8/2003 | Fioravanti | F21S 41/143 257/E33.071 |
| 2016/0003438 | A1* | 1/2016 | Kim | F21S 41/63 362/516 |
| 2022/0003375 | A1* | 1/2022 | Sugiyama | F21S 41/663 |
| 2022/0120406 | A1* | 4/2022 | Woo | F21S 43/20 |

FOREIGN PATENT DOCUMENTS

| | | | |
|---|---|---|---|
| DE | 102013214116 | C5 | 7/2018 |
| DE | 102018217651 | A1 | 4/2020 |
| DE | 102021106101 | A1 | 4/2022 |
| WO | 2019/224185 | A1 | 11/2019 |

* cited by examiner

LAMP FOR VEHICLE

CROSS-REFERENCE TO RELATED APPLICATIONS

This application claims the benefit of priority to Korean Patent Application No. 10-2022-0118744, filed in the Korean Intellectual Property Office on Sep. 20, 2022, the entire contents of which are incorporated herein by reference.

TECHNICAL FIELD

The present disclosure relates to a lamp for a vehicle.

BACKGROUND

In general, a vehicle is equipped with various kinds of lamps having a lighting function for allowing a user to easily identify an object located around a vehicle during nighttime driving and a signal function for informing other vehicles or road users of a driving state of the vehicle.

Among the lamps for a vehicle, a headlamp that forms a low beam pattern or a high beam pattern to secure a front field of view of a driver plays an important role in safe driving. Furthermore, in recent years, differentiation of designs of headlamps has become more important.

Recently, for differentiation of designs of lamps for a vehicle, a lamp for a vehicle for implementing not a lighting image of a shape having a plurality of arranged dots but a lighting image of a linear shape has been developed.

However, there is a limit in implementing a lighting image having a linear shape due to a conventionally separated optical module and the structure thereof. In particular, it is difficult to implement an optical system having a continuous image having no intermittence feeling in a lighting state when the conventional technology is used. Accordingly, it is necessary to develop an optical system technology capable of implementing an image of a continuous linear shape.

SUMMARY

The present disclosure has been made to solve the above-mentioned problems occurring in the prior art while advantages achieved by the prior art are maintained intact.

An aspect of the present disclosure provides a lamp for a vehicle that forms a lighting image having a continuous image with no intermittence feeling in a lighting state.

Another aspect provides a lamp for a vehicle that increases a competition of a product by securing differentiation of designs.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, a lamp for a vehicle includes a first optical module that forms a first light distribution pattern, and including a first light source part and a first condensing lens part that condenses light emitted from the first light source part, a second optical module that forms a second light distribution pattern, and including a second light source part and a second condensing lens part that condenses light emitted from the second light source part, and a third optical module that forms a third light distribution pattern, and including a third light source part and a third condensing lens part that condenses light emitted from the third light source part, the first optical module, the second optical module, and the third optical module are arranged in a vertical direction, and curvatures of light input surfaces of the first condensing lens part, the second condensing lens part, and the third condensing lens part, to which the light is input, are smaller than those of light output surfaces thereof, from which the light is output.

The first optical module may further include a first output lens part that forms the first light distribution pattern with the light emitted from the first light source part, the second optical module may further include a second output lens part that forms the second light distribution pattern with the light emitted from the second light source part, and the third optical module may further include a third output lens part that forms the third light distribution pattern with the light emitted from the third light source part.

The first light distribution pattern, the second light distribution pattern, and the third light distribution pattern may have different light distribution characteristics, the first light distribution pattern and the second light distribution pattern may form a low-beam light distribution pattern, and the third light distribution pattern may form a high-bream light distribution pattern.

The first condensing lens part may include a first light input surface, to which the light is input, and a first light output surface, from which the light is output, the second condensing lens part may include a second light input surface, to which the light is input, and a second light output surface, from which the light is output, and the third condensing lens part may include a third light input surface, to which the light is input, and a third light output surface, from which the light is output.

A vertical focus and a horizontal focus of the first condensing lens part may be the same.

The first condensing lens part may defocus the light input from the first light source part and then may output the defocused light to a front side.

A defocusing degree of the light output from the first condensing lens part in a horizontal direction may be higher than a defocusing degree of the light output from the first condensing lens part in the vertical direction.

The second condensing lens part may defocus the light input from the second light source part and then may output the defocused light to a front side.

A defocusing degree of the light output from the second condensing lens part in a horizontal direction may be higher than a defocusing degree of the light output from the second condensing lens part in the vertical direction.

A horizontal curvature of the second output surface of a second condensing lens part may be larger than a vertical curvature of the second output surface thereof.

A vertical focus and a horizontal focus of the third condensing lens part may be the same.

The third condensing lens part may defocus the light input from the third light source part and then may output the defocused light to a front side.

A defocusing degree of the light output from the third condensing lens part in a horizontal direction may be higher than a defocusing degree of the light output from the third condensing lens part in the vertical direction.

The first optical module may include a first shield part provided between the first condensing lens part band the first output lens part to shield a portion of the light, the second optical module may include a second shield part provided between the second condensing lens part band the second output lens part to shield a portion of the light, and the first shield part and the second shield part may include a cutoff area having a shape corresponding to a cutoff line of a low-beam pattern.

The first optical module may further include a first heat dissipating part, on which the first light source part is mounted, and which emits heat generated in the first light source part, the second optical module may further include a second heat dissipating part, on which the second light source part is mounted, and which emits heat generated in the second light source part, the third optical module may further include a third heat dissipating part, on which the third light source part is mounted, and which emits heat generated in the third light source part, and the first heat dissipating part, the second heat dissipating part, and the third heat dissipating part may be disposed in the vertical direction and are integrally formed with each other.

The first optical module, the second optical module, and the third optical module of the lamp may be arranged downwards in a sequence thereof.

The second optical module may be disposed on a lower side of the first optical module, a plurality of first optical modules, a plurality of second optical modules, and a plurality of third optical modules may be provided, and the plurality of third optical modules may be disposed between the adjacent first optical modules, between the first optical modules and the second optical modules, which are adjacent thereto, between the adjacent second optical modules, and below the second optical modules.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a lamp for a vehicle according to the present disclosure. However, the present disclosure is not limited to the embodiment described below or the technical features of the present disclosure are not limited by the described embodiments, and the present disclosure may be variously modified without departing from the technical scope of the present disclosure.

Figure 1:
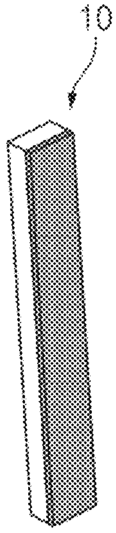
FIG. 1 is a perspective view illustrating a lamp for a vehicle according to an embodiment of the present disclosure.
Figure 2:
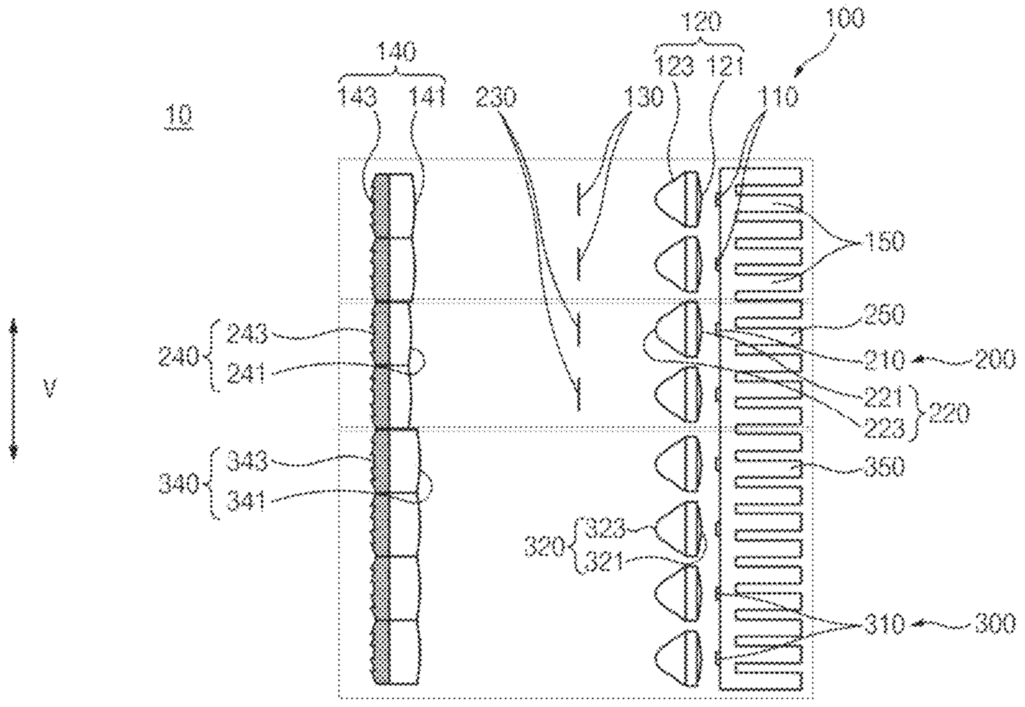
FIG. 2 illustrates a lamp for a vehicle according to an embodiment of the present disclosure, and illustrates a side surface of the lamp for a vehicle.
Figure 3:
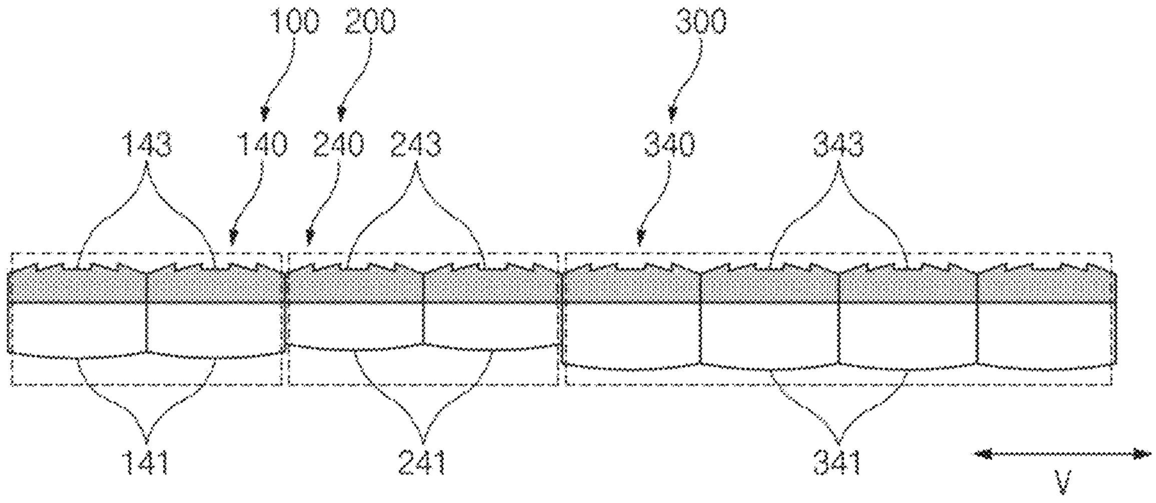
FIG. 3 is a side view of a first output lens part, a second output lens part, and a third output lens part, when viewed from one side in a leftward/rightward direction, according to an embodiment of the present disclosure.
Figure 4:
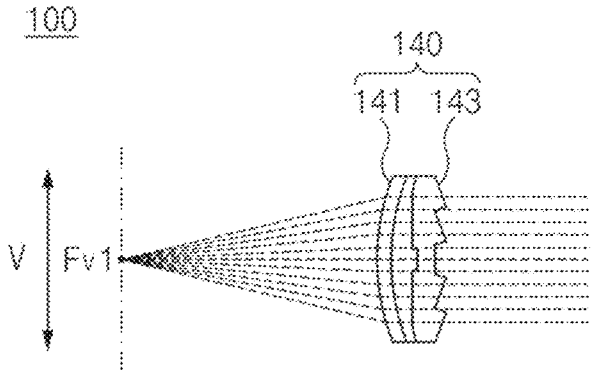
FIG. 4 is a side view of a first output lens part, when viewed from one side in a leftward/rightward direction, according to an embodiment of the present disclosure.
Figure 5:
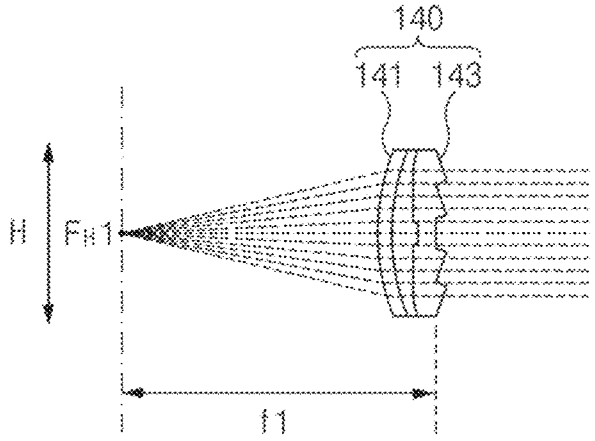
FIG. 5 is a plan view of a first output lens part, when viewed from an upper side, according to an embodiment of the present disclosure.
Figure 6:
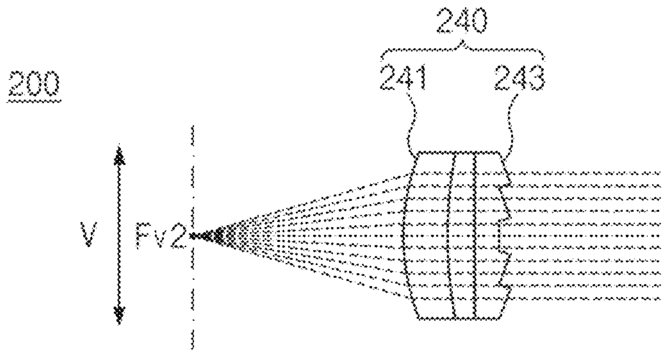
FIG. 6 is a side view of a second output lens part, when viewed from one side in a leftward/rightward direction, according to an embodiment of the present disclosure.
Figure 7:
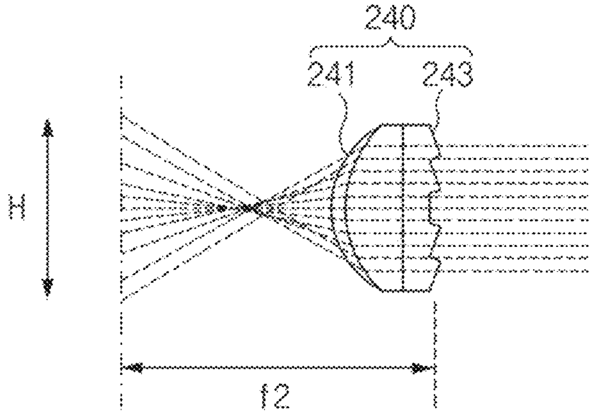
FIG. 7 is a plan view of a second output lens part, when viewed from an upper side, according to an embodiment of the present disclosure.
Figure 8:
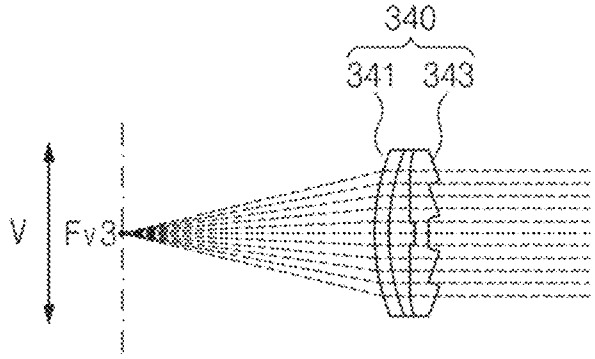
FIG. 8 is a side view of a third output lens part, when viewed from one side in a leftward/rightward direction, according to an embodiment of the present disclosure.
Figure 9:
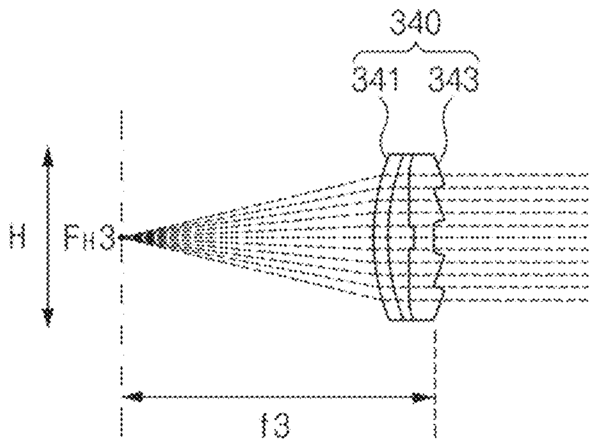
FIG. 9 is a plan view of a third output lens part, when viewed from an upper side, according to an embodiment of the present disclosure.
Figure 10:
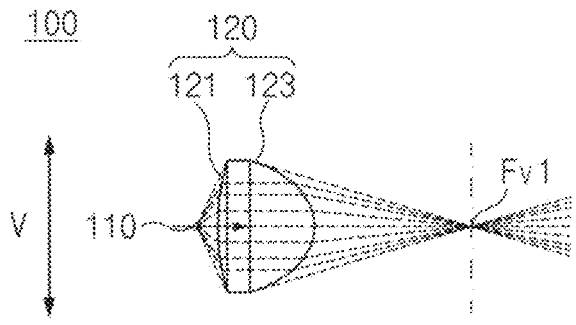
FIG. 10 is a side view of a first condensing lens part, when viewed from one side in a leftward/rightward direction, according to an embodiment of the present disclosure.
Figure 11:
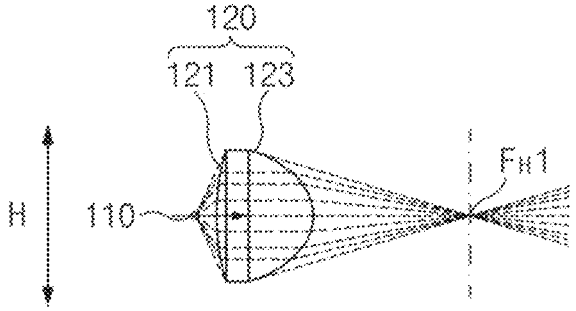
FIG. 11 is a plan view of a first condensing lens part, when viewed from an upper side, according to an embodiment of the present disclosure.
Figure 12:
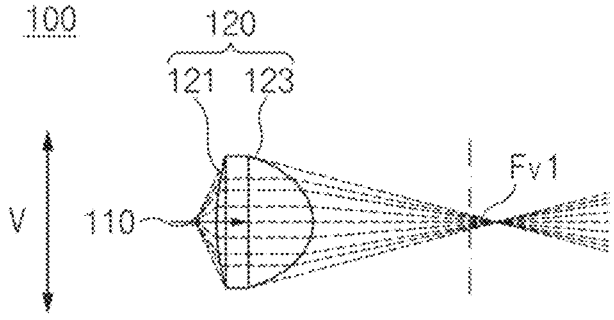
FIG. 12 is a side view of a first condensing lens part, when viewed from one side in a leftward/rightward direction, according to another embodiment of the present disclosure.
Figure 13:
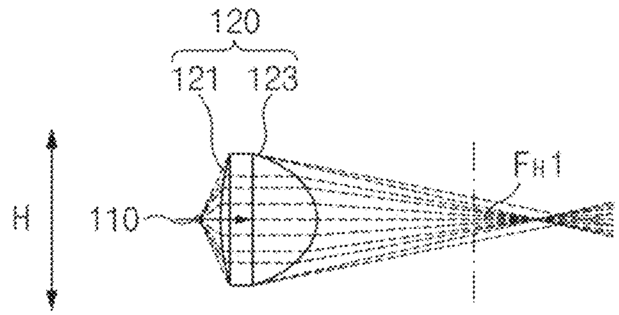
FIG. 13 is a plan view of a first condensing lens part, when viewed from an upper side, according to another embodiment of the present disclosure.

FIG. 1 is a perspective view illustrating a lamp for a vehicle according to an embodiment of the present disclosure. FIG. 2 illustrates a lamp for a vehicle according to an embodiment of the present disclosure, and illustrates a side surface of the lamp for a vehicle. FIG. 3 is a side view of a first output lens part, a second output lens part, and a third output lens part, when viewed from one side in a leftward/rightward direction, according to an embodiment of the present disclosure. FIG. 4 is a side view of a first output lens part, when viewed from one side in a leftward/rightward direction, according to an embodiment of the present disclosure. FIG. 5 is a plan view of a first output lens part, when viewed from an upper side, according to an embodiment of the present disclosure. FIG. 6 is a side view of a second output lens part, when viewed from one side in a leftward/rightward direction, according to an embodiment of the present disclosure. FIG. 7 is a plan view of a second output lens part, when viewed from an upper side, according to an embodiment of the present disclosure. FIG. 8 is a side view of a third output lens part, when viewed from one side in a leftward/rightward direction, according to an embodiment of the present disclosure. FIG. 9 is a plan view of a third output lens part, when viewed from an upper side, according to an embodiment of the present disclosure. FIG. 10 is a side view of a first condensing lens part, when viewed from one side in a leftward/rightward direction, according to an embodiment of the present disclosure. FIG. 11 is a plan view of a first condensing lens part, when viewed from an upper side, according to an embodiment of the present disclosure. FIG. 12 is a side view of a first condensing lens part, when viewed from one side in a leftward/rightward direction, according to another embodiment of the present disclosure. FIG. 13 is a plan view of a first condensing lens part, when viewed from an upper side, according to another embodiment of the present disclosure.

Figure 14:
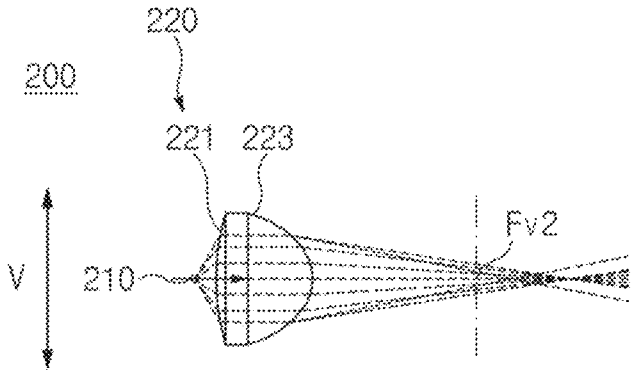
FIG. 14 is a side view of a second condensing lens part, when viewed from one side in a leftward/rightward direction, according to an embodiment of the present disclosure.
Figure 15:
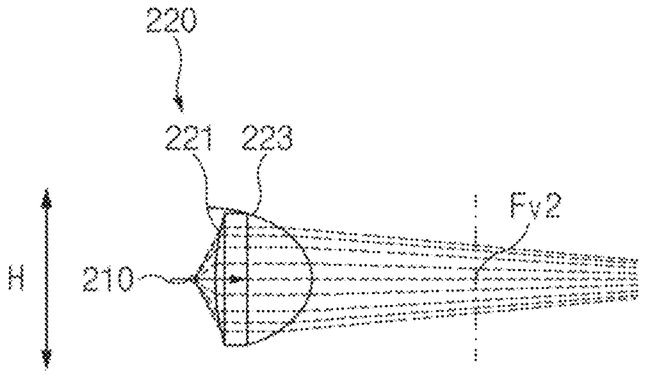
FIG. 15 is a plan view of a second condensing lens part, when viewed from an upper side, according to an embodiment of the present disclosure.
Figure 16:
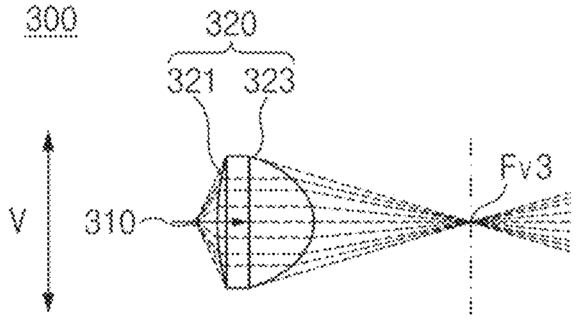
FIG. 16 is a side view of a third condensing lens part, when viewed from one side in a leftward/rightward direction, according to an embodiment of the present disclosure.
Figure 17:
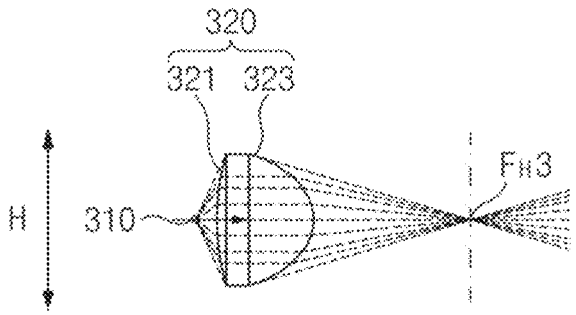
FIG. 17 is a plan view of a third condensing lens part, when viewed from an upper side, according to another embodiment of the present disclosure.
Figure 18:
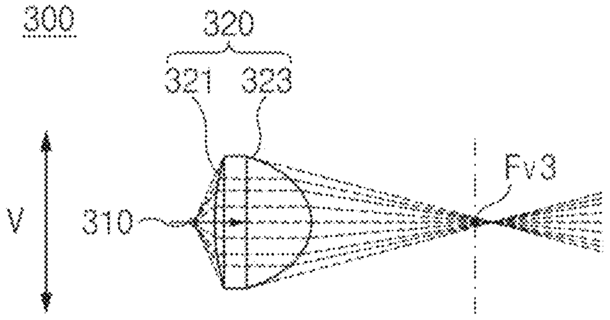
FIG. 18 is a side view of a third condensing lens part, when viewed from one side in a leftward/rightward direction, according to another embodiment of the present disclosure.
Figure 19:
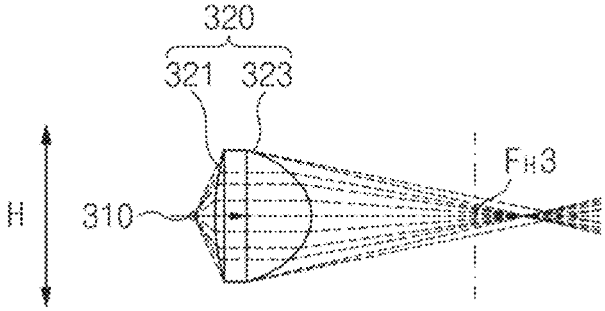
FIG. 19 is a plan view of a third condensing lens part, when viewed from an upper side, according to another embodiment of the present disclosure.

FIG. 14 is a side view of a second condensing lens part, when viewed from one side in a leftward/rightward direction, according to an embodiment of the present disclosure. FIG. 15 is a plan view of a second condensing lens part, when viewed from an upper side, according to an embodiment of the present disclosure. FIG. 16 is a side view of a third condensing lens part, when viewed from one side in a leftward/rightward direction, according to an embodiment of the present disclosure. FIG. 17 is a plan view of a third condensing lens part, when viewed from an upper side, according to another embodiment of the present disclosure. FIG. 18 is a side view of a third condensing lens part, when viewed from one side in a leftward/rightward direction, according to another embodiment of the present disclosure. FIG. 19 is a plan view of a third condensing lens part, when viewed from an upper side, according to another embodiment of the present disclosure.

Figure 20:
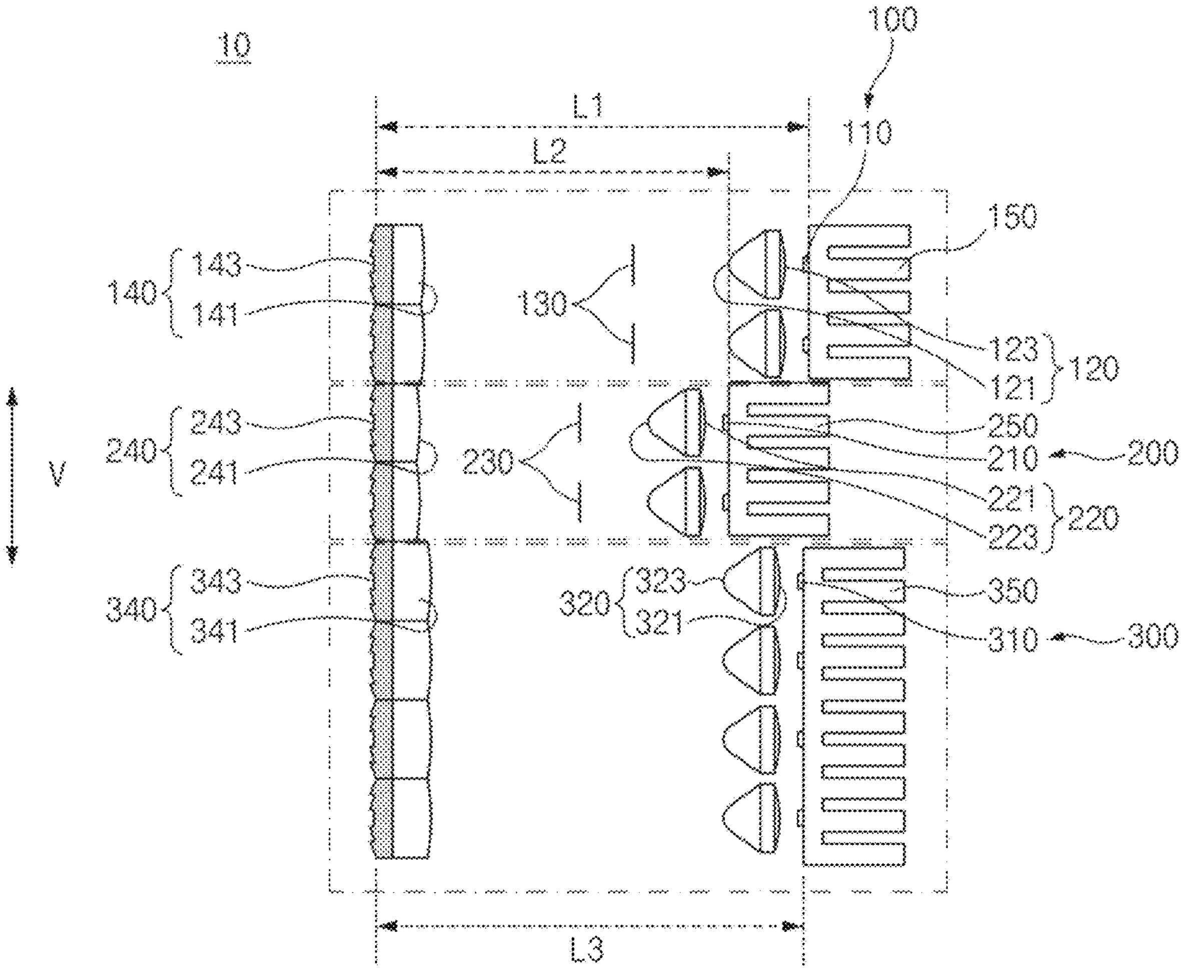
FIG. 20 is a side view illustrating a modification of the lamp for a vehicle according to an embodiment of the present disclosure, which is illustrated in FIG. 20, and an embodiment, in which a first spacing distance, a second distance, and a third spacing distance are different.
Figure 21:
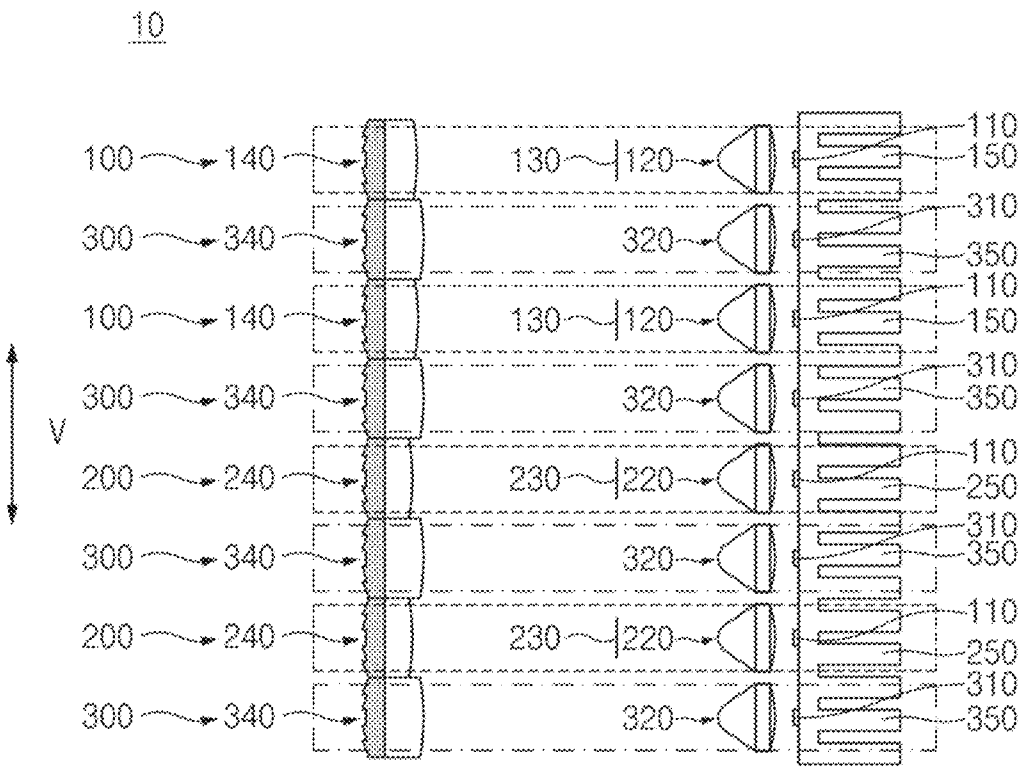
FIG. 21 is a side view illustrating another modification of the lamp for a vehicle according to an embodiment of the present disclosure, which is illustrated in FIG. 2, and an embodiment, third optical modules are disposed between a plurality of first optical modules and a plurality of second optical modules.

FIG. 20 is a side view illustrating a modification of the lamp for a vehicle according to an embodiment of the present disclosure, which is illustrated in FIG. 2, and an embodiment, in which a first spacing distance, a second spacing distance, and a third spacing distance are different. FIG. 21 is a side view illustrating another modification of the lamp for a vehicle according to an embodiment of the present disclosure, which is illustrated in FIG. 2, and an embodiment, third optical modules are disposed between a plurality of first optical modules and a plurality of second optical modules.

Referring to FIGS. 1 to 21, a lamp 10 for a vehicle according to an embodiment of the present disclosure includes a first optical module 100, a second optical module 200, and a third optical module 300. The lamp 10 for a vehicle according to an embodiment of the present disclosure may be used for the purpose of a lighting function (for example, headlamps or fog lamps) or may be used for the purpose of a signal function (for example, turn signal lamps, tail lamps, brake lamps, or side markers), and the present disclosure is neither limited nor restricted by the purposes. For example, the lamp 10 for a vehicle according to an embodiment of the present disclosure may be used for headlamps of a vehicle, which are mounted on a front left side and a front right side of the vehicle, and may be headlamps that may emit low beams and high beams at the same time or individually.

The first optical module 100 is provided to form a first light distribution pattern, and includes a first light source part 110, and a first output lens part 140 that outputs light input from the first light source part 110. Furthermore, the second optical module 200 is provided to form a second light distribution pattern, and includes a second light source part 210, and a second output lens part 240 that outputs light input from the second light source part 210. Furthermore, the third optical module 300 is provided to form a third light distribution pattern, and includes a third light source part 310, and a third output lens part 340 that outputs light input from the third light source part 310.

Here, the first optical module 100, the second optical module 200, and the third optical module 300 may be arranged in a vertical direction, and the first output lens part 140, the second output lens part 240, and the third output lens part 340 may be arranged in the vertical direction and may be integrally formed with each other. In FIGS. 1 to 21, "V" means a direction (the vertical direction) that is perpendicular to a ground surface, and "H" means a horizontal direction (a leftward/rightward direction).

Meanwhile, the first light distribution pattern and the second light distribution pattern may overlap each other to form a low-beam light distribution pattern. Furthermore, the third light distribution pattern may form a high-beam light distribution pattern.

For example, the first light distribution pattern may be, among low-beam light distribution patterns, a hot-zone light distribution pattern for securing a field of view in a central area of a front side of the vehicle. Furthermore, the second light distribution pattern may be, among the low-beam light distribution patterns, a wide-zone light distribution pattern for securing a field of view in a peripheral area on the front side of the vehicle and securing visibility during turning of the vehicle.

Furthermore, the third light distribution pattern may be a high-beam light distribution pattern that is an uplighter that may emit light to a far distance on the front side of the vehicle.

In detail, the first optical module 100 forms the first light distribution pattern, and includes the first light source part 110, the first output lens part 140, and a first condensing lens part 120.

Here, various elements or devices that may emit light may be used for the first light source part 110. For example, the first light source part 110 may include a light source and a board. For example, the light source may be a light emitting diode (hereinafter, will be referred to as an LED), and the board may be a printed circuit board (PCB). However, a configuration of the first light source part 110 is not limited thereto.

The first output lens part 140 may output the light input from the first light source part 110. The first output lens part 140 may form the first light distribution pattern by projecting the light emitted from the first light source part 110.

The first condensing lens part 120 may condense the light emitted from the first light source part 110. The light emitted from the first light source part 110 may be output to a front side by projecting the light to the first output lens part 140 after the light is condensed by the first condensing lens part 120.

The second optical module 200 forms the second light distribution pattern, and includes the second light source part 210, the second output lens part 240, and a second condensing lens part 220.

The second light source part 210, for example, may include a light source and a board. For example, the light source may be a light emitting diode (hereinafter, will be referred to as an LED), and the board may be a printed circuit board (PCB). However, a configuration of the second light source part 210 is not limited thereto.

The second output lens part 240 may output the light input from the second light source part 210. The second output lens part 240 may form the second light distribution pattern with the light emitted from the second light source part 210.

The second condensing lens part 220 may condense the light emitted from the second light source part 210. It may be provided to condense the light emitting from the second light source part 210. The light emitted from the second light source part 210 may be output to a front side by projecting the light to the second output lens part 240 after the light is condensed by the second condensing lens part 220.

The third optical module 300 forms the third light distribution pattern, and includes the third light source part 310, the third output lens part 340, and a third condensing lens part 320.

The third light source part 310, for example, may include a light source and a board. For example, the light source may be a light emitting diode (hereinafter, will be referred to as an LED), and the board may be a printed circuit board (PCB). However, a configuration of the third light source part 310 is not limited thereto.

The third output lens part 340 may output the light input from the third light source part 310. The third output lens part 340 may form the third light distribution pattern with the light emitted from the third light source part 310.

The third condensing lens part 320 may condense the light emitted from the third light source part 310. It may be provided to condense the light emitting from the third light source part 310. The light emitted from the third light source part 310 may be output to a front side by projecting the light to the third output lens part 340 after the light is condensed by the third condensing lens part 320.

As described above, the first optical module 100, the second optical module 200, and the third optical module 300 are arranged in a vertical direction, and the first output lens part 140, the second output lens part 240, and the third output lens part 340 are integrally formed with each other in the vertical direction.

In detail, the lamp 10 for a vehicle according to the present disclosure is an optical system that extends in the vertical direction, and is an optical system that may implement both the high-beam light distribution pattern and the low-beam light distribution pattern. According to the present disclosure, because the first output lens part 140, the second output lens part 240, and the third output lens part 340, which are disposed on the front side, are integrally formed, a lighting image having a continuous linear image without an intermittence feeling in a lighting state may be formed.

Accordingly, differentiation in design of the lamp may be secured, and thus, a competition of the product may be increased.

Meanwhile, the first optical module 100 may further include a first shield part 130 that is provided between the first condensing lens part 120 and the first output lens part 140 to shield a portion of the light. Furthermore, the second optical module 200 may further include a second shield part 230 that is provided between the second condensing lens part 220 and the second output lens part 240 to shield a portion of the light.

The first shield part 130 and the second shield part 230 may include a stepped cutoff area having a shape corresponding to a cutoff line of the low beam pattern.

In detail, the first shield part 130 may be provided with the cutoff area at an upper end thereof, and may form a cutoff line in the first light distribution pattern by restricting the light emitted from the first light source part 110. Furthermore, the second shield part 230 may be provided with the cutoff area at an upper end thereof, and may form a cutoff line in the second light distribution pattern by restricting the light emitted from the second light source part 210.

Meanwhile, the first optical module 100 may further include a first heat dissipating part 150. The first light source part 110 may be mounted on the first heat dissipating part 150, and the first heat dissipating part 150 may emit heat generated in the first light source part 110. The first light source part 110 may include one or a plurality of light sources, and when the plurality of light sources are provided, they may be arranged on a front surface of the first heat dissipating part 150 in the vertical direction.

Meanwhile, the second optical module 200 may further include a second heat dissipating part 250. The second light source part 210 may be mounted on the second heat dissipating part 250, and the second heat dissipating part 250 may emit heat generated in the second light source part 210. The second light source part 210 may include one or a plurality of light sources, and when the plurality of light sources are provided, they may be arranged on a front surface of the second heat dissipating part 250 in the vertical direction.

The third optical module 300 may further include a third heat dissipating part 350. The third light source part 310 may be mounted on the third heat dissipating part 350, and the third heat dissipating part 350 may emit heat generated in the third light source part 310. The third light source part 310 may include one or a plurality of light sources, and when the plurality of light sources are provided, they may be arranged on a front surface of the third heat dissipating part 350 in the vertical direction.

Here, the first heat dissipating part 150, the second heat dissipating part 250, and the third heat dissipating part 350 may be disposed in the vertical direction and may be integrally formed with each other. Accordingly, the present disclosure may implement an optical system that extends in the vertical direction to form a lighting image having a longitudinal shape.

As described above, this may be enabled by the first condensing lens part 120, the second condensing lens part 220, and the third condensing lens part 320, which condense the light emitted to the front side. For example, in a conventional technology, in which a scheme of condensing the light emitted from the light source and causing the light to face the front side uses an elliptical reflective surface structure, the light source emits light not to the front side but to an upper side, and in this case, the heat dissipating members, in which the first light source part, the second light source part, and the third light source part cannot employ heat sinks having a longitudinally long type.

The present disclosure includes the first condensing lens part 120, the second condensing lens part 220, and the third condensing lens part 320, which perform functions of a refractive lens and a condensing lens, and thus may condense the light emitted from the light sources to a front side of a car line and cause the light to face the front side.

Accordingly, according to the present disclosure, as illustrated, a type, in which the first heat dissipating part 150, the second heat dissipating part 250, and the third heat dissipating part 350 extend in the vertical direction and are integrally formed with each other, may be applied. Here, heat dissipating fins provided in the first heat dissipating part 150, the second heat dissipating part 250, and the third heat dissipating part 350 may be designed in a car line direction. Here, the car line means a forward/rearward line with respect to a travel direction of the vehicle.

However, the present disclosure is not limited to a case, in which the first heat dissipating part 150, the second heat dissipating part 250, and the third heat dissipating part 350 are integrally formed with each other, and the first heat dissipating part 150, the second heat dissipating part 250, and the third heat dissipating part 350 may be arranged in the vertical direction and may be assembled after being formed separately (see FIG. 20).

The first output lens part 140 may include a first input surface 141, to which the light is input, and a first output surface 143 from which the light is output, the second output lens part 240 may include a second input surface 241, to which the light is input, and a second output surface 243 from which the light is output, and the third output lens part 340 may include a third input surface 341, to which the light is input, and a third output surface 343 from which the light is output.

Here, the first output surface 143, the second output surface 243, and the third output surface 343 may be multi-focal lenses (MFL). Accordingly, the lamp 10 for a vehicle may enhance light diffusion efficiency and implement surface light emission.

Furthermore, the first output surface 143, the second output surface 243, and the third output surface 343 may have corresponding shapes.

In detail, a plurality of first optical modules 100, a plurality of second optical modules 200, and a plurality of third optical modules 300 may be provided. For example, as in the embodiment illustrated in FIG. 3, two first optical modules 100 and two second optical modules 200 are provided and four third optical modules 300 are provided, the first output lens part 140, the second output lens part 240, and the third output lens part 340 may have a form, in which eight lenses are integrally formed.

Then, when all of the first output surface, the second output surface, and the third output surface have different shapes, senses of difference may be felt for the modules during lights-out, and an intermittence feeling may be generated during the lighting.

Accordingly, in the embodiment of the present disclosure, the first output surface 143, the second output surface 243, and the third output surface 343 may have corresponding shapes. Here, an aspect that the first output surface 143, the second output surface 243, and the third output surface 343 have corresponding shapes means that the first output surface 143, the second output surface 243, and the third output surface 343 are formed in the same way or that they are formed in shapes that are extremely similar enough to be determined to have substantially the same shape by an ordinary person in the art, to which the present disclosure pertains In this case, during the lighting or lights-out, intermittence feelings between the optical modules may be minimized. Furthermore, the optical modules may implement light distribution patterns having different light distribution characteristics by differently designing the shapes of the first input surface 141, the second input surface 241, and the third input surface 341.

In detail, the first input surface 141, the second input surface 241, and the third input surface 341 may have different shapes.

Accordingly, the optical characteristics of the optical modules may be different. The differences between the characteristics of focuses of the first output lens part 140, the second output lens part 240, and the third output lens part 340, which will described below, may be caused by the differences between the shapes of the first input surface 141, the second input surface 241, and the third input surface 341.

Referring to FIGS. 4 and 5, a vertical focus FV1 and a horizontal focus FH1 of the first output lens part 140 may be the same.

For example, a curvature of the first input surface 141 in a horizontal direction "H" and a curvature of the first input surface 141 in a vertical direction "V" may be the same. For example, the first input surface 141 may be aspheric surface, but the present disclosure is not limited thereto. In this way, the first output lens part 140 may be designed such that the curvature thereof in the horizontal direction "V" and the vertical direction "V" have the same shape, and thus a location of the focus in the horizontal direction and a location of the focus in the vertical direction may be the same.

As an example, a lens focal distance f1 that is a distance from the focus FV1 of the first output lens part 140 in the vertical direction or the focus FH1 thereof in the horizontal direction may be 35 mm to 45 mm, but the lens focal distance f1 is not limited thereto.

Referring to FIGS. 6 and 7, the vertical focus FV2 and the horizontal focus of the second output lens part 240 may be different.

For example, a curvature of the second input surface 241 in the horizontal direction and the curvature of the second input surface 241 in the vertical direction may be different. Accordingly, the locations or optical characteristics of the focus in the horizontal direction and the focus in the vertical direction may be different.

The focus of the second output lens part 240 in the vertical direction may be the same as the focus of the first output lens part 140 in the vertical direction, or may be shorter than the focus of the first output lens part 140 in the vertical direction. The lens focus distance f2 that is a distance from the focus FV2 of the second output lens part 240 in the vertical direction to the second output surface 243 may be not more than the lens focal distance f1 of the first output lens part 140.

As an example, the focus FV2 of the second output lens part 240 in the vertical direction may be 30 mm to 45 mm, but the present disclosure is not limited thereto.

The focus of the second output lens part 240 may be formed when the light that passes through the second output lens part 240 is viewed in the vertical direction "V". Furthermore, the light that passes through the second output lens part 240 may be defocused when viewed in the horizontal direction "H".

In detail, a curvature of the second input surface 241 of the second output lens part 240 in the vertical direction and a curvature of the second input surface 241 in the horizontal direction may be designed to have different shape, and thus only the vertical focus may be formed and the horizontal focus may not be formed. Here, the focus FV2 of the second output lens part 240 in the vertical direction, as described above, may be the same as or different from the focus of the first output lens part 140 in the vertical direction.

Furthermore, when the lights that pass through the second output lens part 240 is viewed from an upper side, the passing lights do not form one focus, and the light distribution pattern accordingly is widened in a relatively blurred way. Accordingly, borders of the light distribution patterns that overlap each other become rather blurred, and thus senses of difference between the light distribution patterns are minimized and a uniformity of the low beam patterns may be secured.

The curvature of the second input surface 241 in the horizontal direction may be larger than the curvature of the first input surface 141 in the horizontal direction.

Accordingly, the light introduced into the second input surface 241 with respect to the horizontal direction "H" may cross at a location that is closer to the second output surface 243 than an imaginary line obtained by extending the focus FV1 of the first input surface 141 in leftward and rightward directions, and then may pass through the second output lens part 240. Accordingly, the second light distribution pattern formed by the second optical module may be formed in a range that is wider than the first light distribution pattern.

The vertical focus and the horizontal focus of the third output lens part 340 may be the same.

For example, a curvature of the third input surface 341 in the horizontal direction and the curvature of the third input surface 341 in the vertical direction may be the same. In this way, the third input surface 341 of the third output lens part 340 may be designed such that the curvature thereof in the horizontal direction and the vertical direction have the same shape, and thus a location of the focus in the horizontal direction and a location of the focus in the vertical direction may be the same.

As an example, a lens focal distance f3 that is a distance from the focus FV3 of the third output lens part 340 in the vertical direction or the focus FH3 thereof in the horizontal direction to third output surface 343 may be 30 mm to 40 mm, but the lens focal distance f3 is not limited thereto.

The focus of the third output lens part 340 may be the same as the focus of the first output lens part 140, or may be shorter than the focus of the first output lens part 140. In detail, the lens focus distance f3 that is a distance from the focus FV3 of the third output lens part 340 in the vertical direction to the third output surface 343 may be not more than the lens focal distance f1 of the first output lens part 140.

Meanwhile, as described above, the first optical modules 100, the second optical modules 200, and the third optical modules 300 are arranged in the vertical direction. Furthermore, the curvatures of light input surfaces of the first condensing lens part 120, the second condensing lens part 220, and the third condensing lens part 320, to which the light is input, are smaller than those of input output surfaces thereof, from which the light is output.

In detail, a conventional lamp condenses light emitted from a light source through a combination of a collimator and a condensing lens, but the present disclosure may function to condense the light with one refractive lens. This may be implemented by the first condensing lens part 120, the second condensing lens part 220, and the third condensing lens part 320.

Accordingly, according to the present disclosure, the plurality of condensing lens parts and the plurality of output lens parts may be arranged in the vertical direction, and may condense the light emitted from the light source to the front side of a car line to cause the light to face the front side. Accordingly, according to the present disclosure, as illustrated, a type, in which the first heat dissipating part 150, the second heat dissipating part 250, and the third heat dissipating part 350 extend in the vertical direction and are integrally formed with each other, may be applied.

The first condensing lens part 120 may include a first light input surface 121, to which the light is input, and a first light output surface 123, from which the light is output.

The first light input surface 121 and the first light output surface 123 may be convex surfaces, and a radius of curvature of the first light input surface 121 may be larger than a radius of curvature of the first light output surface 123. That is, the curvature of the first light input surface 121 may be smaller than the curvature of the first light output surface 123.

The second condensing lens part 220 may include a second light input surface 221, to which the light is input, and a second light output surface 223, from which the light is output.

The second light input surface 221 and the second light output surface 223 may be convex surfaces, and a radius of curvature of the second light input surface 221 may be larger than a radius of curvature of the second light output surface 223. That is, the curvature of the second light input surface 221 may be smaller than the curvature of the second light output surface 223.

The third condensing lens part 320 may include a third light input surface 321, to which the light is input, and a third light output surface 323, from which the light is output, The third light input surface 321 and the third light output surface 323 may be convex surfaces, and a radius of curvature of the third light input surface 321 may be larger than a radius of curvature of the third light output surface 323. That is, the curvature of the third light input surface 321 may be smaller than the curvature of the third light output surface 323.

Referring to FIGS. 10 and 11, the vertical focus and the horizontal focus of the first condensing lens part 120 may be the same.

For example, the horizontal curvature of the first light input surface 121 and the vertical curvature of the first light input surface 121 may be the same. For example, the first light input surface 121 may be aspheric surface, but the present disclosure is not limited thereto. In this way, the first condensing lens part 120 may be designed such that the curvature thereof in the horizontal direction and the vertical direction have the same shape, and thus a location of the focus in the horizontal direction and a location of the focus in the vertical direction may be the same.

In this case, for example, the focus of the first condensing lens part 120 in the vertical direction may coincide with the focus FV1 of the first output lens part 140 in the vertical direction. Furthermore, the focus of the first condensing lens part 120 in the horizontal direction may coincide with the focus FH1 of the first output lens part 140 in the horizontal direction.

However, formation of the focus of the first condensing lens part 120 is not limited thereto, and for example, FIGS. 12 and 13 illustrate another example of the first condensing lens part 120.

Referring to the another embodiment illustrated in FIGS. 12 and 13, the first condensing lens part 120 may defocus the light input from the first light source part 110 and output the defocused light to the front side.

For example, the first condensing lens part 120 according to the another embodiment illustrated in FIGS. 12 and 13 may be designed such that the vertical curvature and the horizontal curvature thereof have different shapes, and may be formed such that the lights that pass through the first condensing lens part 120 do not form one focus. Accordingly, the light distribution patterns formed after passing through the first condensing lens part 120 may be widened in a blurred way, and thus, senses of difference between the light distribution patterns may be minimized and low beam pattern having uniform light as a whole may be formed.

Then, a defocusing degree of the light output from the first condensing lens part 120 in the horizontal direction may be higher than a defocusing degree of the light output from the first condensing lens part 120 in the vertical direction. Accordingly, visibility may be enhanced when the light distribution pattern is widened long in the horizontal direction.

Meanwhile, referring to the another embodiment illustrated in FIGS. 14 and 15, the second condensing lens part 220 may defocus the light input from the second light source part 210 and output the defocused light to the front side. That is, the light defocused the second condensing lens part 220 may be input to the second output lens part 240.

In detail, the lights that pass through the second condensing lens part 220 may not form one focus in the vertical direction "V" and the horizontal direction "H". Accordingly, the second light distribution pattern formed by the lights that pass through the second condensing lens part 220 may be widened in a relatively blurred way. Accordingly, the border between the first light distribution pattern and the second light distribution pattern may be blurred whereby senses of difference therebetween may be minimized, and the entire low beam pattern formed by the first light distribution pattern and the second light distribution pattern may be emitted with more uniform light.

Furthermore, for example, a defocusing degree of the light output from the second condensing lens part 220 in the horizontal direction "H" may be higher than a defocusing degree of the light output from the second condensing lens part 220 in the vertical direction. Accordingly, visibility may be enhanced when the light distribution pattern is widened long in the horizontal direction.

The second condensing lens part 220 may be formed such that a horizontal curvature of the second output surface 243 is larger than a vertical curvature of the second output surface 243. Accordingly, a degree, by which the light output from the second condensing lens part 220 is defocused in the horizontal direction "H", may be implemented to be higher than a degree, by which the light output from the second condensing lens part 220 is defocused in the vertical direction.

Furthermore, for example, the lights that pass through the second condensing lens part 220 do not form one focus, but may be condensed in the vertical direction or the horizontal direction "H" and may be input to the second output lens part 240. Then, the lights that pass through the second condensing lens part 220 may be condensed to cross each other, and the crossing point may be located to be closer to the second output lens part 240 than to the vertical focus or the horizontal focus of the second output lens part 240 (see FIGS. 14 and 15). However, it is noted that the above-described concept of condensing is not an expression that is subject to focuses.

Meanwhile Referring to FIGS. 16 and 17, the vertical focus and the horizontal focus of the third condensing lens part 320 may be the same.

For example, the horizontal curvature of the third light input surface 321 and the vertical curvature of the third light input surface 321 may be the same. In this way, the third condensing lens part 320 may be designed such that the curvature thereof in the horizontal direction and the vertical direction have the same shape, and thus a location of the focus in the horizontal direction and a location of the focus in the vertical direction may be the same.

In this case, for example, the focus of the third condensing lens part 320 in the vertical direction may coincide with the focus FV3 of the third output lens part 340 in the vertical direction. Furthermore, the focus of the third condensing lens part 320 in the horizontal direction may coincide with the focus FH3 of the third output lens part 340 in the horizontal direction.

However, formation of the focus of the third condensing lens part 320 is not limited thereto, and for example, FIGS. 18 and 19 illustrate another example of the third condensing lens part 320.

Referring to the another embodiment illustrated in FIGS. 18 and 19, the third condensing lens part 320 may defocus the light input from the third light source part 310 and output the defocused light to the front side.

For example, the third condensing lens part 320 according to the another embodiment illustrated in FIGS. 18 and 19 may be designed such that the vertical curvature and the horizontal curvature thereof have different shapes, and may be formed such that the lights that pass through the third condensing lens part 320 do not form one focus. Accordingly, the light distribution patterns formed after passing through the third condensing lens part 320 may be spread out in a blurred way, and thus, senses of difference between the light distribution patterns may be minimized and low beam pattern having uniform light as a whole may be formed.

Furthermore, for example, a defocusing degree of the light output from the third condensing lens part 320 in the horizontal direction "H" may be higher than a defocusing degree of the light output from the third condensing lens part 320 in the vertical direction. Accordingly, visibility may be enhanced when the light distribution pattern is spread out long in the horizontal direction.

Hereinafter, for convenience of description, a distance between the first light source part 110 and the first output surface 143 of the first output lens part 140 will be defined as a first spacing distance "L1", a distance between the second light source part 210 and the second output surface 243 of the second output lens part 240 will be defined as a second spacing distance "L2", and a distance between the third light source part 310 and the third output surface 343 of the third output lens part 340 will be defined as a third spacing distance "L3" (see L1, L2, and L3 of FIG. 20).

A form of the first light distribution pattern may vary according to the first spacing distance L1 that is the distance between the first light source part 110 and the first output lens part 140. For example, when the first spacing distance L1 is small, a range of the first light distribution pattern may become wide, and when the first spacing distance L1 is large, the range of the first light distribution pattern may become narrower. The principle is applied to the second light distribution pattern according to the second spacing distance L2 and the third light distribution pattern according to the third spacing distance L3 in the same way.

For example, as in the embodiment illustrated in FIG. 2, the first spacing distance, the second spacing distance, and the third spacing distance may be formed in the same way.

In this case, according to the present disclosure, the characteristics of the light distribution patterns may be changed according to the shapes of the first condensing lens part 120, the second condensing lens part 220, and the third condensing lens part 320. Furthermore, in this case, according to the present disclosure, the characteristics of the light distribution patterns may be changed according to the shapes of the first input surface 141, the second input surface 241, and the third input surface 341.

Meanwhile, for example, as in the embodiment illustrated in FIG. 20, according to the present disclosure, the first spacing distance L1, the third spacing distance L3, and the second spacing distance L2 are smaller in a sequence thereof.

Through a design of the first spacing distance L1, the third spacing distance L3, and the second spacing distance L2, which are different, in addition to a design of the shapes of the first condensing lens part 120, the second condensing lens part 220, and the third condensing lens part 320 and a design of the shapes of the first input surface 141, the second input surface 241, and the third input surface 341, the first light distribution pattern, the second light distribution pattern, and the third light distribution pattern may be implemented more effectively.

For example, because the first light distribution pattern forms a hot zone of the low-beam light distribution pattern and the third light distribution pattern is a high-beam light distribution pattern that may be emitted to a far distance, the first spacing distance L1 may be larger than the third spacing distance L3.

Furthermore, because the second light distribution pattern forms a wide zone of the low-beam light distribution pattern, a wide range is necessary for securing a view of field in a peripheral area, and thus the second spacing distance L2 may be larger than the first spacing distance L1 and the third spacing distance L3.

However, the first spacing distance L1, the second spacing distance L2, and the third spacing distance L3 are not limited to the embodiment illustrated in FIGS. 2 and 20, but may be variously changed according to a design specification.

Meanwhile, the first optical module 100, the second optical module 200, and the third optical module 300 may be arranged variously.

For example, as illustrated in FIG. 2, the first optical module 100, the second optical module 200, and the third optical module 300 of the lamp 10 for a vehicle may be arranged downwards in a sequence thereof.

However, in this case, when only any one of the high-beam light distribution pattern and the low-beam light distribution pattern is implemented by the lamp 10 for a vehicle, the lamp design may be viewed as if it was changed when viewed from the outside as only a portion of the lamp 10 for a vehicle having a longitudinal shape is turned on. Accordingly, according to the present disclosure, because the first optical module 100, the second optical module 200, and the third optical module 300 are arranged variously, the lamp 10 for a vehicle having a longitudinal shape is viewed as if the entire lamp was turned on even when only any one of the high-beam light distribution pattern and the low-beam light distribution pattern is implemented.

For example, as in the another embodiment illustrated in FIG. 21, the first optical modules 100, the second optical modules 200, and the third optical modules 300 may be disposed alternately.

In detail, the second optical modules 200 may be disposed below the first optical modules, and a plurality of first optical modules 100, a plurality of second optical modules 200, and a plurality of third optical modules 300 may be provided.

Furthermore, the plurality of third optical modules 300 may be disposed between the adjacent first optical modules 100, between the first optical modules 100 and the second optical modules 200, which are adjacent thereto, between the adjacent second optical modules 200, and below the second optical modules 200.

Accordingly, the plurality of third optical modules 300 that form the third light distribution pattern that is a high-beam pattern may be disposed between the first optical modules 100 and the second optical modules 200 that form the first light distribution pattern and the second light distribution pattern that are low-beam patterns.

In this case, even when only any one of the high-beam light distribution pattern and the low-beam light distribution pattern is implemented, the lamp 10 for a vehicle having a longitudinal shape may be viewed as if the entire lamp was turned on. For example, because the first optical modules 100 and the second optical modules 200 are not turned on but the third optical modules 300 disposed therebetween are turned on when only the high-beam pattern is formed, only amounts of light are different but the lamp 10 for a vehicle may be viewed in a longitudinally long form.

Accordingly, a lighting image design may be maintained in any case.

According to the embodiment of the present disclosure, because the first output lens part, the second output lens part, and the third output lens part, which are disposed on the front side, are integrally formed, a lighting image having a continuous line image without an intermittence feeling in a lighting state may be formed.

Accordingly, according to the present disclosure, differentiation in design of the lamp may be secured, and thus, a competition of the product may be increased.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A lamp for a vehicle, comprising:

a first optical module configured to form a first light distribution pattern, and including a first light source and a first condensing lens configured to condense light emitted from the first light source;

a second optical module configured to form a second light distribution pattern, and including a second light source and a second condensing lens configured to condense light emitted from the second light source; and a third optical module configured to form a third light distribution pattern, and including a third light source and a third condensing lens configured to condense light emitted from the third light source, wherein the first optical module, the second optical module, and the third optical module are aligned in a vertical direction with respect to each other, wherein a light input surface of each of the first condensing lens, the second condensing lens, and the third condensing lens has a curvature that is less than a curvature of a corresponding light output surface of the first condensing lens, the second condensing lens, and the third condensing lens, and wherein the first condensing lens defocuses the light input from the first light source and then outputs the defocused light to a front side of the first condensing lens.

2. The lamp of claim 1, wherein:

the first optical module further includes a first output lens configured to form the first light distribution pattern with the light emitted from the first light source, the second optical module further includes a second output lens configured to form the second light distribution pattern with the light emitted from the second light source, and the third optical module further includes a third output lens configured to form the third light distribution pattern with the light emitted from the third light source.

3. The lamp of claim 1, wherein:

the first light distribution pattern, the second light distribution pattern, and the third light distribution pattern have mutually different light distribution characteristics, the first light distribution pattern and the second light distribution pattern form a low-beam light distribution pattern, and the third light distribution pattern forms a high-bream light distribution pattern.

4. The lamp of claim 1, wherein a vertical focus and a horizontal focus of the first condensing lens are the same.

5. The lamp of claim 1, wherein a defocusing degree of the light output from the first condensing lens in a horizontal direction is higher than a defocusing degree of the light output from the first condensing lens in the vertical direction.

6. The lamp of claim 1, wherein a vertical focus and a horizontal focus of the third condensing lens are the same.

7. The lamp of claim 1, wherein:

the first optical module further includes a first heat dissipating part, on which the first light source is mounted, and which emits heat generated in the first light source, the second optical module further includes a second heat dissipating part, on which the second light source is mounted, and which emits heat generated in the second light source, the third optical module further includes a third heat dissipating part, on which the third light source is mounted, and which emits heat generated in the third light source, and the first heat dissipating part, the second heat dissipating part, and the third heat dissipating part are disposed vertically and are integrally formed with each other.

8. The lamp of claim 1, wherein the first optical module, the second optical module, and the third optical module of the lamp are arranged sequentially downwards.

9. The lamp of claim 1, wherein:

the second optical module is disposed on a lower side of the first optical module, the first optical module, second optical module and third optical module comprise, respectively, a plurality of first optical modules, a plurality of second optical modules, and a plurality of third optical modules, and the plurality of third optical modules are disposed respectively between mutually adjacent first optical modules, between the first optical modules and the second optical modules, adjacent thereto, between mutually adjacent second optical modules, and below the second optical modules.

10. The lamp of claim 1, wherein the third condensing lens defocuses the light input from the third light source and then outputs the defocused light to a front side of the third condensing lens.

11. The lamp of claim 10, wherein a defocusing degree of the light output from the third condensing lens in a horizontal direction is higher than a defocusing degree of the light output from the third condensing lens in the vertical direction.

12. A lamp for a vehicle, comprising:

a first optical module configured to form a first light distribution pattern, and including a first light source and a first condensing lens configured to condense light emitted from the first light source;

a second optical module configured to form a second light distribution pattern, and including a second light source and a second condensing lens configured to condense light emitted from the second light source; and a third optical module configured to form a third light distribution pattern, and including a third light source and a third condensing lens configured to condense light emitted from the third light source, wherein the first optical module, the second optical module, and the third optical module are aligned in a vertical direction with respect to each other, wherein a light input surface of each of the first condensing lens, the second condensing lens, and the third condensing lens has a curvature that is less than a curvature of a corresponding light output surface of the first condensing lens, the second condensing lens, and the third condensing lens, and wherein the second condensing lens defocuses the light input from the second light source and then outputs the defocused light to a front side of the second condensing lens.

13. The lamp of claim 12, wherein a defocusing degree of the light output from the second condensing lens in a horizontal direction is higher than a defocusing degree of the light output from the second condensing lens in the vertical direction.

14. The lamp of claim 12, wherein a horizontal curvature of a second output surface of the second condensing lens is larger than a vertical curvature of the second output surface thereof.

15. A lamp for a vehicle, comprising:

a first optical module configured to form a first light distribution pattern, and including a first light source and a first condensing lens configured to condense light emitted from the first light source;

a second optical module configured to form a second light distribution pattern, and including a second light source and a second condensing lens configured to condense light emitted from the second light source; and a third optical module configured to form a third light distribution pattern, and including a third light source and a third condensing lens configured to condense light emitted from the third light source, wherein the first optical module, the second optical module, and the third optical module are aligned in a vertical direction with respect to each other, wherein a light input surface of each of the first condensing lens, the second condensing lens, and the third condensing lens has a curvature that is less than a curvature of a corresponding light output surface of the first condensing lens, the second condensing lens, and the third condensing lens, and wherein:

the first optical module includes a first shield provided between the first condensing lens and a first output lens to shield a portion of the light, the second optical module includes a second shield provided between the second condensing lens and a second output lens to shield a portion of the light, and the first shield and the second shield include a cutoff area having a shape corresponding to a cutoff line of a low-beam pattern.

* * * * *